Patented Sept. 23, 1952

2,611,762

UNITED STATES PATENT OFFICE 2,611,762

VINYL ACETATE POLYMERIZATION

Stewart B. Luce, La Grange, Ill., assignor to Swift & Company, Chicago, Ill., a corporation of Illinois No Drawing. Application February 11, 1949, Serial No. 75,970

8 Claims. (Cl. 260—78.5)

This invention relates to the polymerization of olefinic compounds and in particular to acceleration of the emulsion polymerization of vinyl acetate.

It is an object of this invention to increase the rate of polymerization of vinyl acetate without affecting the properties of the polyvinyl acetate so formed.

A further object of this invention is to permit an increase in the productive capacity of existing equipment for the polymerization of vinyl acetate without any necessity for change in the amount or type of equipment required.

It is known to the art that certain substances will catalyze or promote the polymerization of vinyl derivatives such as vinyl acetate. Among the better known catalysts are benzoyl peroxide; acetyl benzoyl peroxide; hydrogen peroxide; and other oxygen-yielding compounds, such as the per-acids and the salts of per-acids.

It is further known that an increase in the polymerization rates can be brought about by increasing the catalyst concentration or by reacting the mixture at higher temperatures. Both procedures result in shortened chain length or lower molecular weight, and in addition the reaction may be difficult to control. By use of the method of this invention as hereinafter disclosed, it is possible to effect an increase in the rate of polymerization without the above-mentioned difficulties.

This invention provides a method whereby polymers of vinyl acetate may be produced at a much greater rate than has been possible in the past.

This acceleration in the rate of polymerization of vinyl acetate is obtained through the addition of small amounts of certain specific alkenyl esters to vinyl acetate monomer in aqueous emulsion as accelerators for the polymerization thereof. The term "alkenyl" is a generic term covering the allyl and methallyl radicals.

The compounds which may be used for the purpose of this invention as accelerators for the polymerization of vinyl acetate, either alone or in mixtures of two or more, are: methallyl maleate, phoresin monomer (allyl phosphonic acid ester), allyl itaconate, methallyl itaconate, allyl maleate, methallyl diglycollate, allyl diglycollate, allyl crotonate, and methallyl crotonate.

The term "Phoresin monomer" is descriptive of an allyl ester of an aryl phosphonic acid, specifically, diallyl benzene phosphonate.

The exact mechanics of this reaction are not known. It appears that the role of the alkenyl ester is simply that of increasing the polymerization rate, since the resulting emulsion polymer has the same properties as would result from the polymerization of vinyl acetate alone. There appears to be no copolymerization since when the reaction proceeds according to this invention, the resulting polymer is thermoplastic, soluble in the same solvents as polyvinyl acetate, and is, in fact, indistinguishable from polyvinyl acetate prepared without the accelerator present.

The amount of accelerator to be added to the vinyl acetate monomer varies with the particular accelerator added. In general, concentrations below 1 per cent by weight, based on the amount of vinyl acetate monomer present, give the smooth, stable emulsions which would usually be desired; and for certain esters, such as allyl itaconate and allyl phosphonic acid ester, the critical concentration for a smooth emulsion is below 0.1 per cent. Generally, a range of from about 0.01 per cent to about 1.0 per cent by weight has been found to give good results. However, where the emulsion stability is unimportant, as in processes involving the recovery of the polyvinyl acetate solid from the emulsion, higher concentrations may be used.

The ordinary emulsion polymerization of vinyl acetate as carried out in the presence of a wetting agent, various fillers, water, and a peroxide catalyst, requires about double the time for complete polymerization as does the emulsion polymerization carried out under the same conditions but with a small percentage of one of the accelerators of this invention added.

In carrying out this invention, the vinyl acetate monomer is dispersed in a water medium which may contain the usual fillers, wetting agents, and peroxide catalysts customarily used in the art; and, in addition, there is added thereto a small amount, ranging from about 0.01 per cent to about 1.0 per cent by weight, of one of the accelerating agents of this invention. The emulsion is then heated to reflux temperature, and heating is continued until the vinyl acetate is completely polymerized. The polymer so formed may be separated from the dispersion medium by centrifuging, filtering, or the like and further dried, if necessary, by any suitable means.

It is believed that the contribution of this invention to the art will be readily seen from the following examples which are set forth for the purpose of illustration rather than limitation:

*Example I*

An emulsion polymerization of vinyl acetate was carried out in a water medium in the presence of a conventional filler, wetting agent, and peroxide catalyst both with and without the presence of a small amount of one of the accelerators of this invention, specifically methallyl maleate, and the following times obtained for complete polymerization:

Amount of vinyl acetate monomer present grams__ 645
No accelerator present _____hours__ 4
0.16% (1 g.) methallyl maleate added __do__ 1½

In both cases the whole mixture was stirred and heated on a water bath at reflux. At the start of refluxing the liquid temperature was 65-66° C. After the mixture had thickened to a white, milky product (at a temperature of 88° C.), the reaction was stopped and the mass cooled. In both cases a smooth, thick emulsion of polyvinyl acetate resulted.

*Example II*

In a manner similar to that of Example I, comparative tests were run using 645 grams of vinyl acetate monomer both with and without a small amount of Phoresin monomer added, and the following times for complete polymerization obtained:

Hours
No accelerator present _____ 4
0.08% (0.5 g.) Phoresin monomer added ____ 1½

*Example III*

The comparative times for the complete emulsion polymerization of 645 grams of vinyl acetate monomer under the conditions of Example I, both with and without a small amount of allyl itaconate added as accelerator, were:

Hours
No accelerator present _____ 4
0.08% (0.5 g.) allyl itaconate added _____ 1⅓

In this case, with the accelerator present, a grainy emulsion resulted from which the polymer was easily separated.

Similar results were obtained when the alkenyl ester added as an accelerator was methallyl itaconate, allyl maleate, methallyl diglycollate, allyl diglycollate, allyl crotonate, methallyl crotonate or mixtures thereof.

It is apparent from the above examples that this invention results in a considerable reduction in the time required to obtain complete emulsion polymerization of vinyl acetate. As a result of this invention, the time required for the emulsion polymerization of vinyl acetate may be cut approximately in half with a consequent saving in both time and money to the industry. The smooth, stable emulsion polymers of vinyl acetate produced by the preferred methods disclosed in the foregoing specific examples, have been found to be especially adapted for use as adhesives.

Obviously, many modifications and variations of the invention as hereinbefore set forth may be made without departing from the spirit and scope thereof, and therefore only such limitations should be imposed as are indicated in the appended claims.

I claim:

1. A method for increasing the rate of emulsion homopolymerization of vinyl acetate which consists in forming an aqueous emulsion of vinyl acetate, adding to said emulsion 0.16% by weight of methallyl maleate, and heating said emulsion containing said methallyl maleate to polymerize the vinyl acetate at an increased rate.

2. A method for increasing the rate of emulsion homopolymerization of vinyl acetate which consists in forming an aqueous emulsion of vinyl acetate, adding to said emulsion 0.08% by weight of an allyl ester of benzene phosphonic acid, and heating said emulsion containing said allyl ester of benzene phosphonic acid to polymerize the vinyl acetate at an increased rate.

3. A method for increasing the rate of emulsion homopolymerization of vinyl acetate which consists in forming an aqueous emulsion of vinyl acetate, adding to said emulsion 0.08% by weight of an allyl itaconate, and heating said emulsion containing said allyl itaconate to polymerize the vinyl acetate at an increased rate.

4. A method for increasing the rate of emulsion homopolymerization of vinyl acetate which consists in forming an aqueous emulsion of vinyl acetate, adding to said emulsion a perceptible amount less than 1% by weight of a polymerization accelerator selected from the group consisting of the alkenyl esters having not more than 4 carbon atoms in each alkenyl group of maleic, itaconic, diglycollic, crotonic, and benzene phosphonic acids, and heating said emulsion containing said accelerator to polymerize the vinyl acetate at an increased rate.

5. A method as in claim 4 wherein the amount of said accelerator present is within the range of from about 0.01% by weight up to about 1% by weight.

6. A method as in claim 4 wherein the accelerator is allyl itaconate.

7. A method as in claim 4 wherein the accelerator is methallyl maleate.

8. A method as in claim 4 wherein the accelerator is an allyl ester of benzene phosphonic acid.

STEWART B. LUCE.

REFERENCES CITED

The following references are of record in the file of this patent:

UNITED STATES PATENTS

| Number | Name | Date |
|---|---|---|
| 2,124,630 | Quattlebaum | July 26, 1938 |
| 2,202,846 | Garvey et al. | June 4, 1940 |
| 2,310,731 | D'Alelio | Feb. 9, 1943 |
| 2,332,896 | D'Alelio | Oct. 26, 1943 |
| 2,410,089 | Lundquist et al. | Oct. 29, 1946 |
| 2,453,167 | Toy | Nov. 9, 1948 |
| 2,496,384 | De Nie | Feb. 7, 1950 |

OTHER REFERENCES

Barron: "Modern Plastics," pages 373-375, published by Wiley, N. Y., 1945.